US007873363B1

(12) United States Patent
Hieb

(10) Patent No.: US 7,873,363 B1
(45) Date of Patent: Jan. 18, 2011

(54) METHOD FOR IDENTIFYING UNIQUE FM TRANSMITTER LOCATIONS WITH ENHANCED TRANSMISSION COVERAGE

(76) Inventor: Mario K. Hieb, 36 H St., #2, Salt Lake City, UT (US) 84103

( * ) Notice: Subject to any disclaimer, the term of this patent is extended or adjusted under 35 U.S.C. 154(b) by 1001 days.

(21) Appl. No.: 11/709,404

(22) Filed: Feb. 22, 2007

Related U.S. Application Data

(60) Provisional application No. 60/775,484, filed on Feb. 22, 2006.

(51) Int. Cl.
*H04B 17/00* (2006.01)
*H04M 3/00* (2006.01)
*H04W 40/00* (2009.01)

(52) U.S. Cl. .................. 455/446; 455/67.11; 455/67.14; 455/115.1; 455/418

(58) Field of Classification Search .................. 455/62, 455/63.1, 63.4, 66.1, 67.11–67.16, 68–69, 455/71, 91, 93, 115.1–115.3, 403, 418, 422.1, 455/423–425, 446–451, 452.1–452.2, 453, 455/500–509, 513–514, 524, 561, 562.1, 455/7, 15–18, 24, 63.2, 67.7; 343/874, 890
See application file for complete search history.

(56) References Cited

U.S. PATENT DOCUMENTS 5,613,217 A * 3/1997 Hagstrom et al. ........ 455/67.11
5,668,562 A * 9/1997 Cutrer et al. ................. 343/703
5,960,341 A * 9/1999 LeBlanc et al. .......... 455/426.1
6,091,580 A * 7/2000 Yoshida et al. .............. 369/286
6,097,957 A * 8/2000 Bonta et al. ................. 455/446
6,466,560 B1 * 10/2002 Lee et al. ..................... 370/335
7,085,280 B2 * 8/2006 Martin, IV .................. 370/408
2004/0006535 A1 * 1/2004 Forbes et al. ................... 705/38
2004/0236547 A1 * 11/2004 Rappaport et al. ............. 703/2
2006/0128372 A1 * 6/2006 Gazzola ...................... 455/424
2006/0240834 A1 * 10/2006 Sawaya et al. .............. 455/446
2007/0117565 A1 * 5/2007 Lidbrink ..................... 455/446

* cited by examiner

*Primary Examiner*—Meless N Zewdu
(74) *Attorney, Agent, or Firm*—John R. Thompson; Stoel Rives LLP

(57) ABSTRACT

A method is disclosed for locating a transmitter site location area and identifying optimal transmitter sites within the area that have favorable characteristics to allow for FM signals to be transmitted to cover a radio market. Through use of FCC tables, the required distance from a proposed station to any co-channel, adjacent channel, and IF spaced stations are determined. The area is determined by utilizing city of license criteria where proposed stations can be located and plotted on the map. Candidate station locations with favorable height within the area are determined. Each candidate station location is tested to predict coverage and path profile.

52 Claims, 3 Drawing Sheets

Map Scale: 1:2026139  1"=31.98 mi  V|H Size: 177.70 x 284.09 mi

The symbol '+' indicates a location of a town and the associated text is the town name.

Figure 2

SORTED BY POPULATION RANK

| SITE | LAT | LON | CLASS | POP RANK | COR-AGL (FT) | COR-HAAT (FT) | HAAT/AGL | ERP (KW) | LOCATION |
|---|---|---|---|---|---|---|---|---|---|
| #15SPEC | 44-10-05.4 N | 117-40-13.3 W | C | 1 | 164 | 2335 | 14.2 | 205.0 | Cottonwood Mountain |
| #10SPEC | 44-09-20.8 N | 117-36-45.2 W | C | 2 | 656 | 2221 | 3.4 | 243.0 | Cottonwood Mountain |
| #7SPEC | 43-38-22.9 N | 117-23-17.2 W | C | 3 | 1214 | 1978 | 1.6 | 250.0 | Grassy Mountain |
| #21 | 43-40-06.1 N | 117-25-30.1 W | C | 4 | 1804 | 2030 | 1.1 | 95.3 | Sourdough Mountain |
| #2SPEC | 43-37-25.0 N | 117-34-05.3 W | C | 5 | 656 | 1991 | 3.0 | 250.0 | Freezeout Mountain |
| #22 | 43-36-25.1 N | 117-30-43.1 W | C | 6 | 1542 | 1984 | 1.3 | 95.3 | Sourdough Mountain |
| #7 | 43-38-22.9 N | 117-23-17.2 W | C | 7 | 1214 | 1978 | 1.6 | 100.0 | Grassy Mountain |
| #2 | 43-37-25.0 N | 117-34-05.3 W | C | 8 | 656 | 1991 | 3.0 | 100.0 | Freezeout Mountain |
| #16 | 43-41-19.8 N | 117-31-09.5 W | C | 9 | 1312 | 2053 | 1.6 | 92.5 | Butte above Snow Basin |
| KQTA | 43-37-15.0 N | 117-12-35.0 W | C | 10 | 266 | 1036 | 3.9 | 100.0 | Butte above Owyhee Dam |
| #20 | 43-35-17.5 N | 117-30-50.4 W | C | 11 | 1804 | 2047 | 1.1 | 93.5 | Butte above Sheep Creek |
| #14 | 43-16-29.5 N | 117-12-35.9 W | C | 12 | 1312 | 1938 | 1.5 | 100.0 | Brooks Cabin |
| #4 | 43-14-06.4 N | 117-15-17.3 W | C | 13 | 656 | 2529 | 3.9 | 55.6 | Mahogany Mountain |
| #13 | 43-14-49.5 N | 117-14-27.8 W | C | 14 | 328 | 2145 | 6.5 | 83.0 | Mahogany Mountain |
| #9 | 43-14-15.5 N | 117-13-36.7 W | C | 15 | 656 | 2109 | 3.2 | 86.9 | Mahogany Mountain |
| #15 | 44-10-05.4 N | 117-40-13.3 W | C | 16 | 164 | 2335 | 14.2 | 65.0 | Cottonwood Mountain |
| #10 | 44-09-20.8 N | 117-36-45.2 W | C | 17 | 656 | 2221 | 3.4 | 76.9 | Cottonwood Mountain |
| #17 | 43-40-37.4 N | 117-38-52.8 W | C | 18 | 1640 | 2020 | 1.2 | 96.0 | Butte above Military Reservoir |
| #18 | 43-40-15.8 N | 117-39-14.8 W | C | 19 | 1640 | 2043 | 1.2 | 93.5 | Butte above Military Reservoir |
| #19 | 43-34-23.8 N | 117-40-37.1 W | C | 20 | 1640 | 2096 | 1.3 | 88.2 | Rufino Butte |
| #12 | 43-10-11.8 N | 117-06-43.5 W | C | 21 | 1312 | 2004 | 1.5 | 97.8 | Butte above Thomas Creek Basin |
| #11 | 43-06-47.1 N | 117-03-58.4 W | C | 22 | 1968 | 1932 | 1.0 | 100.0 | Sheaville |
| KDBI | 43-45-18.0 N | 116-05-52.0 W | C | B | 220 | 2549 | 11.6 | 57.0 | Boise Ridge |

Map Scale: 1:2026139   1"=31.98 mi   V|H Size: 177.70 x 284.09 mi

The symbol '+' indicates a location of a town and the associated text is the town name.

ated at coordinates 44-07-11 N latitude and 117-18-22 W longitude and point E located at coordinates 44-19-36 N latitude and 118-00-07 W longitude, a straight line between point E and point F located at coordinates 43-12-08 N latitude and 118-00-22 W longitude, a straight line between point F and point C located at coordinates 43-24-11 N latitude and 117-18-22 W longitude, and a curvilinear arc defined by a radius extending a distance of 104.5 kilometers from point A at coordinates 43-45-20 N latitude and 116-05-51 W longitude, such arc connecting points B and C. The coordinates of the FCC allocation used in this implementation of the present embodiment of the invention are 44-00-06.0 N latitude and 117-21-32.0 W longitude.

METHOD FOR IDENTIFYING UNIQUE FM TRANSMITTER LOCATIONS WITH ENHANCED TRANSMISSION COVERAGE

RELATED APPLICATIONS

The application claims priority to U.S. Patent Application No. 60/775,484, entitled "Unique FM Transmitter Locations for the Boise Radio Market" which was filed on Feb. 22, 2006, and which is incorporated herein by reference.

TECHNICAL FIELD

This invention relates to FM broadcast transmission sites and their unique locations to optimize and enhance transmission coverage.

BRIEF DESCRIPTION OF THE DRAWINGS

A more particular description of the invention briefly described above will be rendered by reference to the appended figures. Understanding that these figures only provide information concerning typical embodiments of the invention and are not therefore to be considered limiting of its scope, the invention will be described and explained with additional specificity and detail through the use of the accompanying figures, in which:

FIG. 2 is a table identifying the specific latitudinal and longitudinal coordinates of specific transmitter sites within the area depicted in FIG. 1.

DETAILED DESCRIPTION OF PREFERRED EMBODIMENTS

Figure 3:
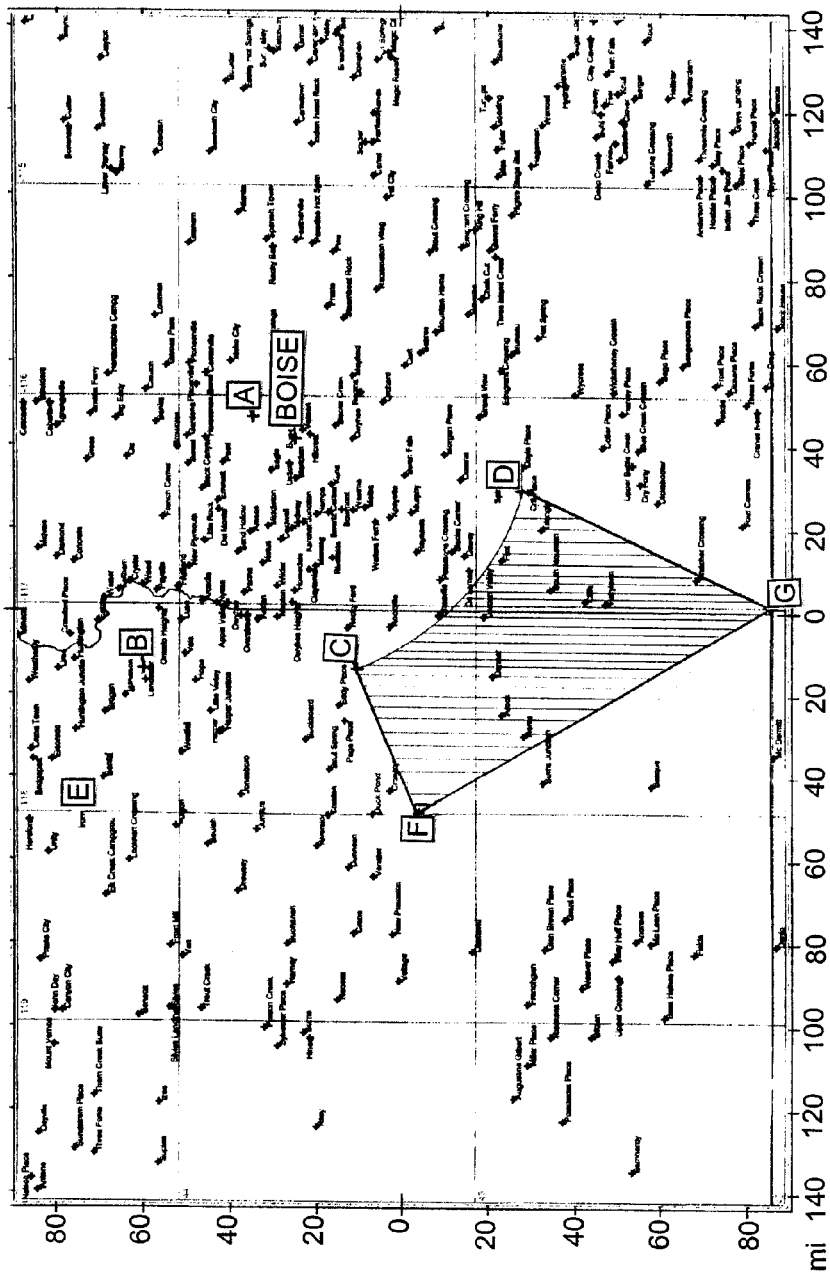
FIG. 3 is a map depicting an area of Oregon and Idaho within which regulations and conditions allow placement of transmitter sites that can transmit to the Boise radio market if such transmitters are used in conjunction with boosters.

The embodiments of the disclosure will be best understood by reference to the drawings. It will be readily understood that the components of the present disclosure, as generally described and illustrated in the Figures herein, could be implemented in a wide variety of different configurations. Thus, the following more detailed description of particular implementations of the embodiments of the method, as represented in FIGS. 1 through 3, is not intended to limit the scope of the disclosure, as claimed, but is merely representative of possible embodiments of the disclosure.

In some cases, well-known structures, materials, or operations are not shown or described in detail. Furthermore, the described features, structures, or characteristics may be combined in any suitable manner in one or more embodiments. It will also be readily understood that the components of the embodiments as generally described and illustrated in the Figures herein could be arranged and designed in a wide variety of different configurations.

A "rim-shot" FM broadcast transmission facility scenario has been identified near Vale, Oreg., for coverage on the Boise, Id., market. Although over 60 miles away, excellent coverage of Boise is achievable. FIG. 1 depicts one implementation of an embodiment of the present invention, indicating with a hatched area the general proposed transmission site location area identified by the present embodiment. The boundary of the general proposed transmission site of this implementation is marked by a straight line between point B located at coordinates 44-07-11 N latitude and 117-18-22 W longitude and point E located at coordinates 44-19-36 N latitude and 118-00-07 W longitude, a straight line between point E and point F located at coordinates 43-12-08 N latitude and 118-00-22 W longitude, a straight line between point F and point C located at coordinates 43-24-11 N latitude and 117-18-22 W longitude, and a curvilinear arc defined by a radius extending a distance of 104.5 kilometers from point A at coordinates 43-45-20 N latitude and 116-05-51 W longitude, such arc connecting points B and C. The coordinates of the FCC allocation used in this implementation of the present embodiment of the invention are 44-00-06.0 N latitude and 117-21-32.0 W longitude.

Figure 1:
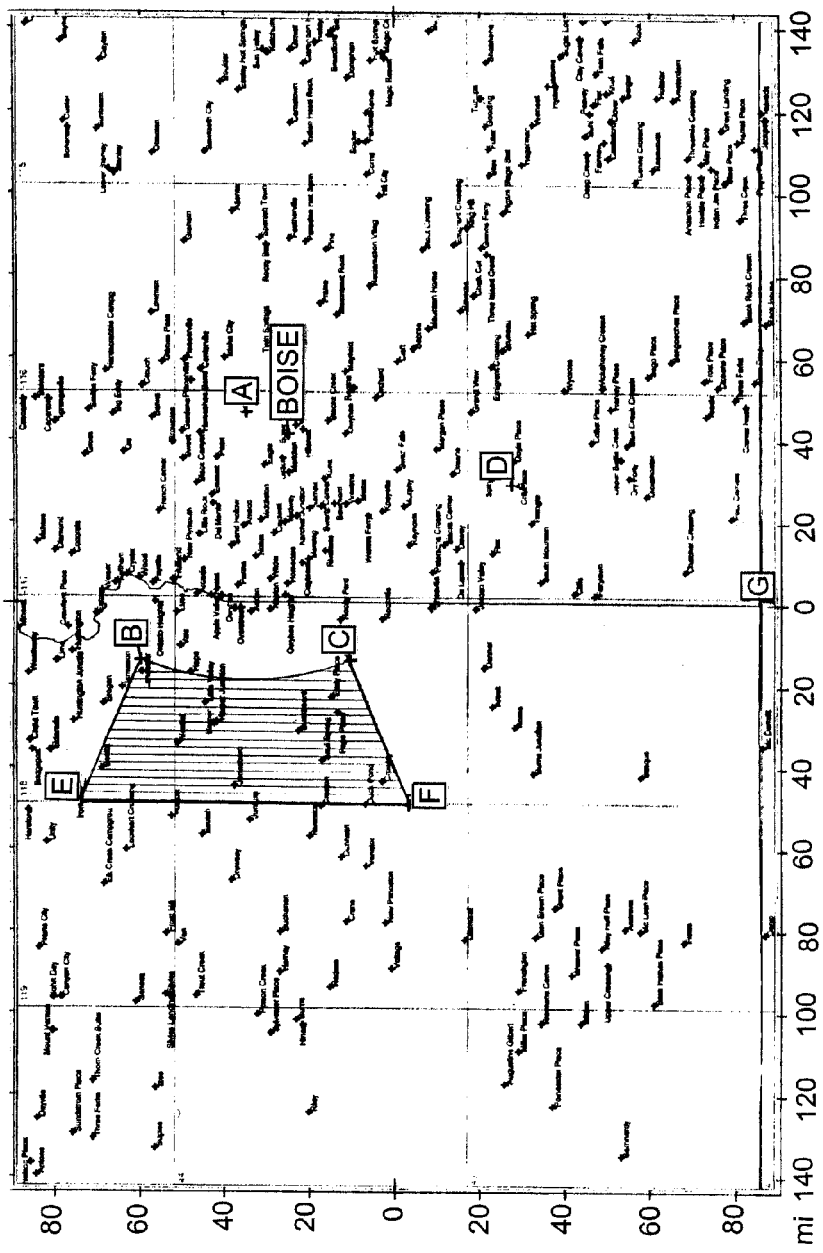
FIG. 1 is a map depicting an area of Oregon within which regulations and conditions allow placement of transmitter sites to give coverage to the Boise radio market.

A general proposed transmission site location area, such as is indicated in FIG. 1 (and FIG. 3), is determined by several factors including terrain, FCC spacing rules, and RF propagation. Within a general proposed transmission site location area, certain sites have certain unique characteristics that make them particularly suited for Boise radio market FM transmission sites. Such characteristics include terrain, height above average terrain, proximity to power, roads, obstructions to the Boise market, distance to the Boise market, curvature of earth, FCC separation rules, and other various factors.

The implementation of the embodiment of the present invention also identifies certain sites as having favorable characteristics that will allow for additional FM signals to be moved into the Boise radio market. In the present embodiment, there are only a handful of (or fewer) locations that allow for a plurality of new signals into the Boise market. Alternatively, or through FCC rulemaking, new allocations may be created.

FIG. 2 gives the coordinates for the specific sites having favorable characteristics allowing FM signals to be moved into the Boise radio market.

FIG. 3 depicts an implementation of another embodiment of the present invention, indicating with a hatched area the general proposed transmission site location area identified by the implementation of the embodiment. The boundary of the general proposed transmission site of this implementation is marked by a straight line between point C located at coordinates 43-24-11 N latitude and 117-18-22 W longitude and point F located at coordinates 43-12-08 N latitude and 118-00-22 W longitude, a straight line between point F and point G located at coordinates 42-00-34 N latitude and 116-59-53 W longitude, a straight line between point C and point D located at coordinates 42-51-00 N latitude and 116-26-53 W longitude, and a curvilinear arc defined by a radius extending a distance of 104.5 kilometers from point A at coordinates 43-45-20 N latitude and 116-05-51 W longitude, such arc connecting points C and D.

Specific transmittal sites identified by the implementation of the embodiment depicted in FIG. 3 may require the assistance of a booster site to allow the signal to reach areas of the Boise radio market that are shadowed by the terrain from receiving the direct signal. A booster is a type of transmission equipment that is different from a transmitter, boosting and, if necessary, redirecting a signal to reach a shadowed area rather than directly transmitting. A booster is placed according to FCC regulation. Whether a given area is shadowed from a direct signal also is determined according FCC regulation.

Factors that affect FM transmitter site location include:

1. FCC spacing rules (other stations already on the air);
2. FCC city of license rules;
3. FCC class minimum requirements;

4. Terrain between transmitter site and the desired coverage area;

5. Distance from desired coverage area;

6. HAAT (Height Above Average Terrain), determined using an FCC formula;

7. Center of Radiation (COR) height above ground level;

8. Earth curvature;

9. Land ownership, ease of development;

10. Access to the land; roads, climate, etc.;

11. Power availability;

12. Tower requirements, namely whether there is enough land for a tower;

13. Additional allocations, other stations that can co-locate on the site; and

14. Possibility, under regulations, of utilizing booster fill-in to reach portions of the market that are shadowed from receiving a direct transmission.

The following steps may be performed to locate optimal transmitter locations:

1. Using FCC tables, determine the required distance from the proposed station to any co-channel, adjacent channel, and IF spaced stations and plot on a map.

2. Determine the area, utilizing city of license criteria (F(50,50) 70 dBu contours), Longley-Rice dBu coverage, etc., where proposed stations can be located and plot on the map. Typically, a clear line of site to the city of licenses is desirable.

3. Determine candidate station locations with favorable Height Above Average Terrain (HAAT) and height Above Mean Sea Level (AMSL) within the acceptable common area determined in steps 1 and 2. Typically, a high AMSL to HAAT ratio will give the best results.

4. Calculate tower height above ground level (AGL) and required Center of Radiation (COR) for the desired class station. Consider RFR requirements when determining COR.

5. Test each candidate station location, determined in step 3, for predicted coverage of the desired coverage area using a computer-based RF propagation program.

6. Test each candidate station location, determined in step 3, for path profile and Fresnel zone clearance to the desired populated area.

7. Use contour protection analysis to determine if the proposed station can be moved closer to the desired coverage area.

8. Perform a population vs. signal strength analysis for favorable candidate station locations.

9. Evaluate candidate station locations that are favorable for intervening terrain, land ownership, existing roads, power availability, telephone service, required tower height, proximity to airports, zoning, and any other siting factors.

10. Test favorable candidate station locations for possible move-ins.

11. Employ tower face enhanced antenna patterns, if appropriate.

12. Plot the candidate stations' F(50,50) 60 dBu contour. Analyze for possible booster fill-in.

With regard to specific sites indicated in the embodiment of the present invention depicted by FIGS. 1 and 2, although Site #7 may create slightly better signal coverage than Site #2, it will require a taller tower and may not facilitate as many move-ins.

Further, to meet FCC requirements, a Class C FM at Site #2 would require a Center of Radiation ("COR") height above ground level of 230 meters for a 100,000 watt power output. Site #7 would require a COR 390 meters above ground level for 100 kilo watt power output.

In summary, in implementing one embodiment of the present invention, there is identified a general area where the allotment Vale, Oreg., 288C can be located. There are some locations within this general area that put a signal into Boise better than others. Each of these locations meet FCC city of license requirements. Longley-Rice coverage studies have been conducted for selected locations, using various radiation heights above ground level. A few select areas that provide excellent coverage of the Boise radio market have been identified. There is a possibility of more Class C FM stations that can be moved to, or allocated to one or more selected sites. Each station is worth considerable value, if it can cover the Boise market well.

It will be obvious to those having skill in the art that many changes may be made to the details of the above-described embodiments without departing from the underlying principles of the invention.

What is claimed is:

1. A method for positioning and constructing an FM broadcast radio station, the method comprising:

locating an acceptable transmitter site location area from which FM signals can be transmitted to cover at least a portion of a desired radio broadcast market, including:

using FCC F(50,50) FM broadcast tables, determining a required spacing from a proposed FM broadcast radio station location to a co-channel, adjacent channel, and an intermediate frequency (IF) spaced FM broadcast radio stations and plot the required spacing on a map; and determining the acceptable transmitter site location area, utilizing FCC city of license criteria, where proposed FM broadcast radio stations can be located and plotted on the map;

identifying optimal FM broadcast radio station locations within the acceptable transmitter site location area that have favorable characteristics to allow the FM signals to be transmitted to cover the desired radio market, including:

determining one or more candidate FM broadcast radio station locations with favorable Height Above Average Terrain (HAAT) and height Above Mean Sea Level (AMSL) within the acceptable transmitter site location area;

calculating a tower height above ground level (AGL) and a required Center of Radiation (COR) for a desired class of FM broadcast radio station, considering FM broadcast band radio frequency radiation (RFR) requirements when determining the COR;

testing each candidate FM broadcast radio station location for a predicted coverage of the desired radio market using a computer-based radio frequency (RF) propagation program;

testing each of the candidate FM broadcast radio station locations for a path profile and a Fresnel zone clearance for the desired radio market;

using a contour protection analysis to determine whether the proposed FM broadcast radio station can be moved closer to the desired radio market;

identifying one or more favorable candidate FM broadcast radio station locations based on the results of the testing for the predicted coverage and the testing for the path profile and Fresnel zone clearance;

performing a population vs. signal strength analysis for the favorable candidate FM broadcast radio station locations;

evaluating the favorable candidate station locations that are favorable for one or more of intervening terrain, land ownership, existing roads, power availability, telephone service, required tower height, proximity to airports, and zoning;

testing each of the favorable candidate station locations for possible move-in of other FM broadcast radio stations;

employing tower face enhanced antenna patterns, as appropriate;

plotting the favorable candidate FM broadcast radio station locations and analyzing each favorable FM broadcast radio station location for possible FM booster station fill-in; and selecting the at least one of the favorable candidate FM broadcast radio station locations as a designated station location; and constructing an FM broadcast radio station at the designated station location, including erecting a broadcast tower and an antenna attached to the broadcast tower having a COR matching the calculated COR.

2. The method of claim 1, wherein locating an acceptable transmitter site location area further comprises:

identifying a boundary marked by a straight line between a coordinate point at 44-07-11 N latitude and 117-18-22 W longitude and a coordinate point at 44-19-36 N latitude and 118-00-07 W longitude, a straight line between the coordinate point at 44-19-36 N latitude and 118-00-07 W longitude and a coordinate point at 43-12-08 N latitude and 118-00-22 W longitude, a straight line between the coordinate point at 43-12-08 N latitude and 118-00-22 W longitude and a coordinate point at 43-24-11 N latitude and 117-18-22 W longitude, and a curvilinear arc defined by a radius extending a distance of 104.5 kilometers from a coordinate point located at 43-45-20 N latitude and 116-05-51 W longitude, such arc connecting the coordinate point at 44-07-11 N latitude and 117-18-22 W longitude and the coordinate point at 43-24-11 N latitude and 117-18-22 W longitude.

3. The method of claim 1, wherein one of the one or more candidate FM broadcast radio station locations is determined to be located at coordinate point 44-10-05.4 N latitude, 117-40-13.3 W longitude.

4. The method of claim 1, wherein one of the one or more candidate FM broadcast radio station locations is determined to be located at coordinate point 44-09-20.8 N latitude, 117-36-45.2 W longitude.

5. The method of claim 1, wherein one of the one or more candidate FM broadcast radio station locations is determined to be located at coordinate point 43-38-22.9 N latitude, 117-23-17.2 W longitude.

6. The method of claim 1, wherein one of the one or more candidate FM broadcast radio station locations is determined to be located at coordinate point 43-40-06.1 N latitude, 117-25-30.1 W longitude.

7. The method of claim 1, wherein one of the one or more candidate FM broadcast radio station locations is determined to be located at coordinate point 43-37-25.0 N latitude, 117-34-05.3 W longitude.

8. The method of claim 1, wherein one of the one or more candidate FM broadcast radio station locations is determined to be located at coordinate point 43-36-25.1 N latitude, 117-30-43.1 W longitude.

9. The method of claim 1, wherein one of the one or more candidate FM broadcast radio station locations is determined to be located at coordinate point 43-38-22.9 N latitude, 117-23-17.2 W longitude.

10. The method of claim 1, wherein one of the one or more candidate FM broadcast radio station locations is determined to be located at coordinate point 43-37-25.0 N latitude, 117-34-05.3 W longitude.

11. The method of claim 1, wherein one of the one or more candidate FM broadcast radio station locations is determined to be located at coordinate point 43-41-19.8 N latitude, 117-31-09.5 W longitude.

12. The method of claim 1, wherein one of the one or more candidate FM broadcast radio station locations is determined to be located at coordinate point 43-37-15.0 N latitude, 117-12-35.0 W longitude.

13. The method of claim 1, wherein one of the one or more candidate FM broadcast radio station locations is determined to be located at coordinate point 43-35-17.5 N latitude, 117-30-50.4 W longitude.

14. The method of claim 1, wherein one of the one or more candidate FM broadcast radio station locations is determined to be located at coordinate point 43-16-29.5 N latitude, 117-12-35.9 W longitude.

15. The method of claim 1, wherein one of the one or more candidate FM broadcast radio station locations is determined to be located at coordinate point 43-14-06.4 N latitude, 117-15-17.3 W longitude.

16. The method of claim 1, wherein one of the one or more candidate FM broadcast radio station locations is determined to be located at coordinate point 43-14-49.5 N latitude, 117-14-27.8 W longitude.

17. The method of claim 1, wherein one of the one or more candidate FM broadcast radio station locations is determined to be located at coordinate point 43-14-15.5 N latitude, 117-13-36.7 W longitude.

18. The method of claim 1, wherein one of the one or more candidate FM broadcast radio station locations is determined to be located at coordinate point 44-10-05.4 N latitude, 117-40-13.3 W longitude.

19. The method of claim 1, wherein one of the one or more candidate FM broadcast radio station locations is determined to be located at coordinate point 44-09-20.8 N latitude, 117-36-45.2 W longitude.

20. The method of claim 1, wherein one of the one or more candidate FM broadcast radio station locations is determined to be located at coordinate point 43-40-37.4 N latitude, 117-38-52.8 W longitude.

21. The method of claim 1, wherein one of the one or more candidate FM broadcast radio station locations is determined to be located at coordinate point 43-40-15.8 N latitude, 117-39-14.8 W longitude.

22. The method of claim 1, wherein one of the one or more candidate FM broadcast radio station locations is determined to be located at coordinate point 43-34-23.8 N latitude, 117-40-37.1 W longitude.

23. The method of claim 1, wherein one of the one or more candidate FM broadcast radio station locations is determined to be located at coordinate point 43-10-11.8 N latitude, 117-06-43.5 W longitude.

24. The method of claim 1, wherein one of the one or more candidate FM broadcast radio station locations is determined to be located at coordinate point 43-06-47.1 N latitude, 117-03-58.4 W longitude.

25. The method of claim 1, wherein one of the one or more candidate FM broadcast radio station locations is determined to be located at coordinate point 43-45-18.0 N latitude, 116-05-52.0 W longitude.

26. The method of claim 1, wherein locating an acceptable transmitter site location area further comprises:

identifying a boundary marked by a straight line between a coordinate point at 43-24-11 N latitude and 117-18-22 W longitude and a coordinate point at 43-12-08 N latitude and 118-00-22 W longitude, a straight line between the coordinate point at 43-12-08 N latitude and 118-00-22 W longitude and a coordinate point at 42-00-34 N latitude and 116-59-53 W longitude, a straight line between the coordinate point at 42-00-34 N latitude and 116-59-53 W longitude and a coordinate point at 42-51-00 N latitude and 116-26-53 W longitude, and a curvilinear arc defined by a radius extending a distance of 104.5 kilometers from a coordinate point at 43-45-20 N latitude and 116-05-51 W longitude, such arc connecting the coordinate point at 43-24-11 N latitude and 117-18-22 W longitude and the coordinate point at 42-51-00 N latitude and 116-26-53 W longitude.

27. The method of claim 26, wherein determining one or more candidate FM broadcast radio station locations further comprises determining, within governing regulations, a location for a booster for each candidate site.

28. A method for transmitting an FM signal to cover the Boise radio market, comprising:
identifying a transmitter site location area having a boundary marked by a straight line between a coordinate point at 44-07-11 N latitude and 117-18-22 W longitude and a coordinate point at 44-19-36 N latitude and 118-00-07 W longitude, a straight line between the coordinate point at 44-19-36 N latitude and 118-00-07 W longitude and a coordinate point at 43-12-08 N latitude and 118-00-22 W longitude, a straight line between the coordinate point at 43-12-08 N latitude and 118-00-22 W longitude and a coordinate point at 43-24-11 N latitude and 117-18-22 W longitude, and a curvilinear arc defined by a radius extending a distance of 104.5 kilometers from a coordinate point located at 43-45-20 N latitude and 116-05-51 W longitude, such arc connecting the coordinate point at 44-07-11 N latitude and 117-18-22 W longitude and the coordinate point at 43-24-11 N latitude and 117-18-22 W longitude; and
identifying one or more candidate FM broadcast station locations within the transmitter site location area having characteristics to allow the FM signals to be transmitted to cover the Boise radio market, including:
determining one or more candidate FM broadcast radio station locations with favorable Height Above Average Terrain (HAAT) and height Above Mean Sea Level (AMSL) within the transmitter site location area;
calculating a tower height above ground level (AGL) and a required Center of Radiation (COR) for a desired class of FM broadcast radio station, considering FM broadcast band radio frequency radiation (RFR) requirements when determining the COR;
testing each candidate FM broadcast radio station location for a predicted coverage of The Boise radio market using a computer-based radio frequency (RF) propagation program, testing each of the candidate FM broadcast radio station location for a path profile and a Fresnel zone clearance to the desired radio market;
performing a population vs. signal strength analysis for each of the candidate FM broadcast radio station locations;
testing each of the candidate FM broadcast station locations for possible move-in of other FM broadcast radio stations;
analyzing each FM broadcast radio station location for possible FM booster station fill-in;
selecting at least one of the candidate FM broadcast radio station locations as a designated station location; and
constructing an FM broadcast radio station at the designated station location, including erecting a broadcast tower and an antenna attached to the broadcast tower having a COR matching the calculated COR;
transmitting an FM signal to cover the Boise radio market using the constructed FM broadcast radio station.

29. The method of claim 28, wherein one of the one or more candidate FM broadcast radio stations is located at coordinate point 44-10-05.4 N latitude, 117-40-13.3 W longitude.

30. The method of claim 28, wherein one of the one or more candidate FM broadcast radio stations is located at coordinate point 44-09-20.8 N latitude, 117-36-45.2 W longitude.

31. The method of claim 28, wherein one of the one or more candidate FM broadcast radio stations is located at coordinate point 43-38-22.9 N latitude, 117-23-17.2 W longitude.

32. The method of claim 28, wherein one of the one or more candidate FM broadcast radio stations is located at coordinate point 43-40-06.1 N latitude, 117-25-30.1 W longitude.

33. The method of claim 28, wherein one of the one or more candidate FM broadcast radio stations is located at coordinate point 43-37-25.0 N latitude, 117-34-05.3 W longitude.

34. The method of claim 28, wherein one of the one or more candidate FM broadcast radio stations is located at coordinate point 43-36-25.1 N latitude, 117-30-43.1 W longitude.

35. The method of claim 28, wherein one of the one or more candidate FM broadcast radio stations is located at coordinate point 43-38-22.9 N latitude, 117-23-17.2 W longitude.

36. The method of claim 28, wherein one of the one or more candidate FM broadcast radio stations is located at coordinate point 43-37-25.0 N latitude, 117-34-05.3 W longitude.

37. The method of claim 28, wherein one of the one or more candidate FM broadcast radio stations is located at coordinate point 43-41-19.8 N latitude, 117-31-09.5 W longitude.

38. The method of claim 28, wherein one of the one or more candidate FM broadcast radio stations is located at coordinate point 43-37-15.0 N latitude, 117-12-35.0 W longitude.

39. The method of claim 28, wherein one of the one or more candidate FM broadcast radio stations is located at coordinate point 43-35-17.5 N latitude, 117-30-50.4 W longitude.

40. The method of claim 28, wherein one of the one or more candidate FM broadcast radio stations is located at coordinate point 43-16-29.5 N latitude, 117-12-35.9 W longitude.

41. The method of claim 28, wherein one of the one or more candidate FM broadcast radio stations is located at coordinate point 43-14-06.4 N latitude, 117-15-17.3 W longitude.

42. The method of claim 28, wherein one of the one or more candidate FM broadcast radio stations is located at coordinate point 43-14-49.5 N latitude, 117-14-27.8 W longitude.

43. The method of claim 28, wherein one of the one or more candidate FM broadcast radio stations is located at coordinate point 43-14-15.5 N latitude, 117-13-36.7 W longitude.

44. The method of claim 28, wherein one of the one or more candidate FM broadcast radio stations is located at coordinate point 44-10-05.4 N latitude, 117-40-13.3 W longitude.

45. The method of claim 28, wherein one of the one or more candidate FM broadcast radio stations is located at coordinate point 44-09-20.8 N latitude, 117-36-45.2 W longitude.

46. The method of claim 28, wherein one of the one or more candidate FM broadcast radio stations is located at coordinate point 43-40-37.4 N latitude, 117-38-52.8 W longitude.

47. The method of claim 28, wherein one of the one or more candidate FM broadcast radio stations is located at coordinate point 43-40-15.8 N latitude, 117-39-14.8 W longitude.

48. The method of claim 28, wherein one of the one or more candidate FM broadcast radio stations is located at coordinate point 43-34-23.8 N latitude, 117-40-37.1 W longitude.

49. The method of claim 28, wherein one of the one or more candidate FM broadcast radio stations is located at coordinate point 43-10-11.8 N latitude, 117-06-43.5 W longitude.

50. The method of claim 28, wherein one of the one or more candidate FM broadcast radio stations is located at coordinate point 43-06-47.1 N latitude, 117-03-58.4 W longitude.

51. The method of claim 28, wherein one of the one or more candidate FM broadcast radio stations is located at coordinate point 43-45-18.0 N latitude, 116-05-52.0 W longitude.

52. A method for transmitting an FM signal to cover the Boise radio market, comprising:

identifying a transmitter site location area having a boundary marked by a straight line between a coordinate point at 43-24-11 N latitude and 117-18-22 W longitude and a coordinate point at 43-12-08 N latitude and 118-00-22 W longitude, a straight line between the coordinate point at 43-12-08 N latitude and 118-00-22 W longitude and a coordinate point at 42-00-34 N latitude and 116-59-53 W longitude, a straight line between the coordinate point at 42-00-34 N latitude and 116-59-53 W longitude and a coordinate point at 42-51-00 N latitude and 116-26-53 W longitude, and a curvilinear arc defined by a radius extending a distance of 104.5 kilometers from a coordinate point at 43-45-20 N latitude and 116-05-51 W longitude, such arc connecting the coordinate point at 43-24-11 N latitude and 117-18-22 W longitude and the coordinate point at 42-51-00 N latitude and 116-26-53 W longitude; and identifying one or more optimal transmitter sites within the transmitter site location area having characteristics to allow FM signals to be transmitted to cover the Boise radio market with the aid of a booster, including determining one or more candidate FM broadcast radio station locations with favorable Height Above Average Terrain (HAAT) and height Above Mean Sea Level (AMSL) within the transmitter site location area;

calculating a tower height above ground level (AGL) and a required Center of Radiation (COR) for a desired class of FM broadcast radio station, considering FM broadcast band radio frequency radiation (RFR) requirements when determining the COR;

testing each candidate FM broadcast radio station location for a predicted coverage of the Boise radio market using a computer-based radio frequency (RF) propagation program;

testing each candidate FM broadcast radio station location for a path profile and a Fresnel zone clearance to the desired radio market;

performing a population vs. signal strength analysis for each of the candidate FM broadcast radio station locations;

testing each of the candidate FM broadcast station locations for possible move-in of other FM broadcast radio stations;

analyzing each FM broadcast radio station location for possible FM booster station fill-in; and selecting at least one of the candidate FM broadcast radio station locations as a designated station location; and constructing an FM broadcast radio station at the designated station location, including erecting a broadcast tower and an antenna attached to the broadcast tower having a COR matching the calculated COR;

transmitting an FM signal to cover the Boise radio market using the constructed FM broadcast radio station.

* * * * *